United States Patent
Stadtfeld et al.

(10) Patent No.: US 10,814,415 B2
(45) Date of Patent: Oct. 27, 2020

(54) MONO-BLADE BEVEL GEAR CUTTING TOOL

(71) Applicant: THE GLEASON WORKS, Rochester, NY (US)

(72) Inventors: Hermann J. Stadtfeld, Webster, NY (US); Anthony J. Norselli, Hilton, NY (US); Paul B. Spencer, Ontario, NY (US)

(73) Assignee: THE GLEASON WORKS, Rochester, NY (US)

( * ) Notice: Subject to any disclaimer, the term of this patent is extended or adjusted under 35 U.S.C. 154(b) by 70 days.

(21) Appl. No.: 16/069,899

(22) PCT Filed: Jan. 31, 2017

(86) PCT No.: PCT/US2017/015791
§ 371 (c)(1),
(2) Date: Jul. 13, 2018

(87) PCT Pub. No.: WO2017/136329
PCT Pub. Date: Aug. 10, 2017

(65) Prior Publication Data
US 2019/0022779 A1    Jan. 24, 2019

Related U.S. Application Data (60) Provisional application No. 62/289,470, filed on Feb. 1, 2016.

(51) Int. Cl.
*B23F 19/12* (2006.01)
*B23F 9/12* (2006.01)
(Continued)

(52) U.S. Cl.
CPC .................. *B23F 9/12* (2013.01); *B23C 5/22* (2013.01); *B23F 9/10* (2013.01); *B23F 21/128* (2013.01);
(Continued)

(58) Field of Classification Search
CPC .... B23F 1/06; B23F 9/08; B23F 9/082; B23F 9/10; B23F 9/105; B23F 9/12; B23F 9/14;
(Continued)

(56) References Cited

U.S. PATENT DOCUMENTS 781,851 A * 2/1905 Taylor .................. B23C 5/2472
407/39
1,411,390 A   4/1922 Tibbetts
(Continued)

FOREIGN PATENT DOCUMENTS

DE       852029 C   10/1952
DE       47583 A    8/1966

OTHER PUBLICATIONS

International Search Report and Written Opinion for PCT/US2017/015791, ISA/EPO, dated Apr. 10, 2017, 14 pgs.

*Primary Examiner* — Sunil K Singh
*Assistant Examiner* — Yasir A Diab
(74) *Attorney, Agent, or Firm* — Robert L. McDowell (57) ABSTRACT

A gear cutting tool wherein each cutting blade group includes two differently positioned but identical cutting blades (41, 40) such as an one outside and one inside blade. The inventive blade arrangement only requires a single type of blade (30) in order to simultaneously cut the convex and the concave tooth flanks of a gear as well as the root fillet and root bottom portions of tooth slots. The cutter system allows radial adjustment of the outside cutting blade and the inside cutting blade independently of one another. Addition-
(Continued)

ally, inside and outside cutting blades may be exchanged with one another.

1 Claim, 10 Drawing Sheets

(51) Int. Cl.
| | |
|---|---|
| *B23F 21/12* | (2006.01) |
| *B23F 21/22* | (2006.01) |
| *B23C 5/22* | (2006.01) |
| *B23F 9/10* | (2006.01) |
| *B23F 1/06* | (2006.01) |
| *B23F 19/00* | (2006.01) |

(52) U.S. Cl.
CPC ...... *B23F 21/226* (2013.01); *B23C 2210/285* (2013.01); *B23F 1/06* (2013.01); *B23F 19/007* (2013.01); *Y10T 409/101908* (2015.01); *Y10T 409/104293* (2015.01); *Y10T 409/104452* (2015.01)

(58) Field of Classification Search
CPC ...... B23F 19/005; B23F 19/007; B23F 23/00; B23F 23/003; B23F 23/006; B23F 23/125; B23F 21/128; B23F 21/22; B23F 21/223; B23F 21/226; B23C 5/22; B23C 2210/285; Y10T 407/1705; Y10T 407/171; Y10T 407/1735; Y10T 407/174; Y10T 407/1745; Y10T 409/101908; Y10T 409/103816; Y10T 409/103975; Y10T 409/104134; Y10T 409/104293; Y10T 409/104452; Y10T 409/104611; Y10T 409/106042; Y10T 409/108268; Y10T 409/108427

See application file for complete search history.

(56) References Cited

U.S. PATENT DOCUMENTS

| | | | | |
|---|---|---|---|---|
| 2,586,955 | A * | 2/1952 | Kaiser | B23C 5/242 407/42 |
| 3,571,876 | A * | 3/1971 | Blakesley | B23F 21/226 407/22 |
| 3,961,406 | A | 6/1976 | Hunkeler | |
| 4,268,194 | A * | 5/1981 | Bloink | B23F 21/226 407/22 |
| 5,598,618 | A | 2/1997 | Aquino et al. | |
| 5,934,841 | A * | 8/1999 | Rutschke | B23F 21/226 407/22 |
| 6,120,217 | A | 9/2000 | Stadtfeld et al. | |
| 6,311,590 | B1 * | 11/2001 | Stadtfeld | B23F 21/226 407/20 |
| 6,540,446 | B2 * | 4/2003 | Iizuka | B23F 21/226 407/113 |
| 6,609,858 | B1 * | 8/2003 | Francis | B23F 21/226 407/113 |
| 6,632,050 | B2 * | 10/2003 | Erickson | B23F 21/226 407/21 |
| 7,775,749 | B2 | 8/2010 | Ribbeck | |
| 8,882,414 | B2 * | 11/2014 | Kreh | B23F 9/105 409/26 |
| 8,992,144 | B2 | 3/2015 | Dürr et al. | |
| 2007/0011855 | A1 * | 1/2007 | Ribbeck | B23F 21/226 29/56.5 |
| 2012/0027531 | A1 * | 2/2012 | Kreh | B23F 9/105 409/26 |
| 2015/0306688 | A1 | 10/2015 | Stadtfeld et al. | |

* cited by examiner

MONO-BLADE BEVEL GEAR CUTTING TOOL

FIELD OF THE INVENTION

The invention is directed to cutting tools for producing gears and in particular to cutting tools having differently positioned but identical cutting blades for producing gear teeth.

BACKGROUND OF THE INVENTION

Figure 1:
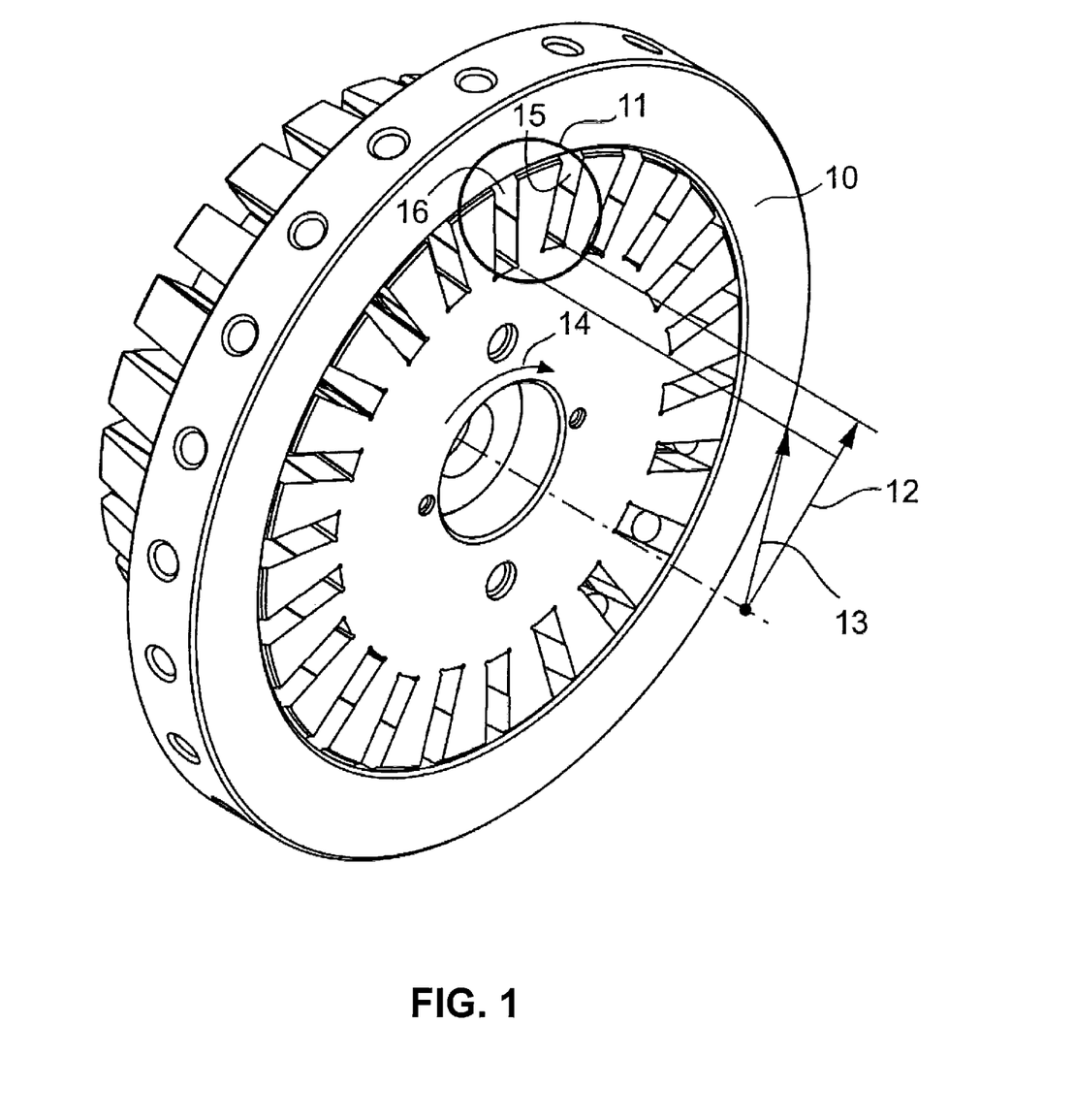
FIG. 1 shows a three-dimensional view of a face milling cutter head with rectangular blade slots.

Bevel and hypoid gears can be cut in a single indexing process (face milling) or in a continuous indexing process (face hobbing). Both processes use cutter heads 10 with a plurality of slot groups (equal blade groups) represented in FIG. 1 by the slot groups 11. FIG. 1 shows a three-dimensional view of a face milling cutter head 10 with rectangular outside blade slots 15 and rectangular inside blade slots 16. Slots 15 and 16 represent one blade group 11. Cutter head 10 rotates during the cutting process in direction 14.

Each blade group usually consists of one to three blades assembled in the respective cutter head slots. In case of three blades per blade group, commonly a first blade is a rougher or bottom blade. The rougher or bottom blades of all blade groups rough the convex and concave flank surfaces as well as the root fillets and bottoms of a bevel gear. The second blade of each blade group is commonly an outside blade. The outside blades of all blade groups finish cut the concave flank surfaces and the concave side root fillets. A third blade in each blade group commonly is an inside blade. The inside blades of all blade groups finish cut the convex flank surfaces and the concave side root fillets, A more common arrangement is a cutter head 10 with two slots per blade group 11. The first blade of each blade group of the cutter head is an outside blade (slot bottom radius 12). The outside blades of all blade groups have the duty of roughing and finishing the concave flanks and the concave side of the root fillets including a part of the root bottom of all slots on a bevel gear. The second blade of each blade group of said cutter head is an inside blade (slot bottom radius 13). The inside blades of all blade groups have the duty of roughing and finishing the convex flanks and the convex side of the root fillets including a part of the root bottom of all slots on a bevel gear.

Figure 2A:
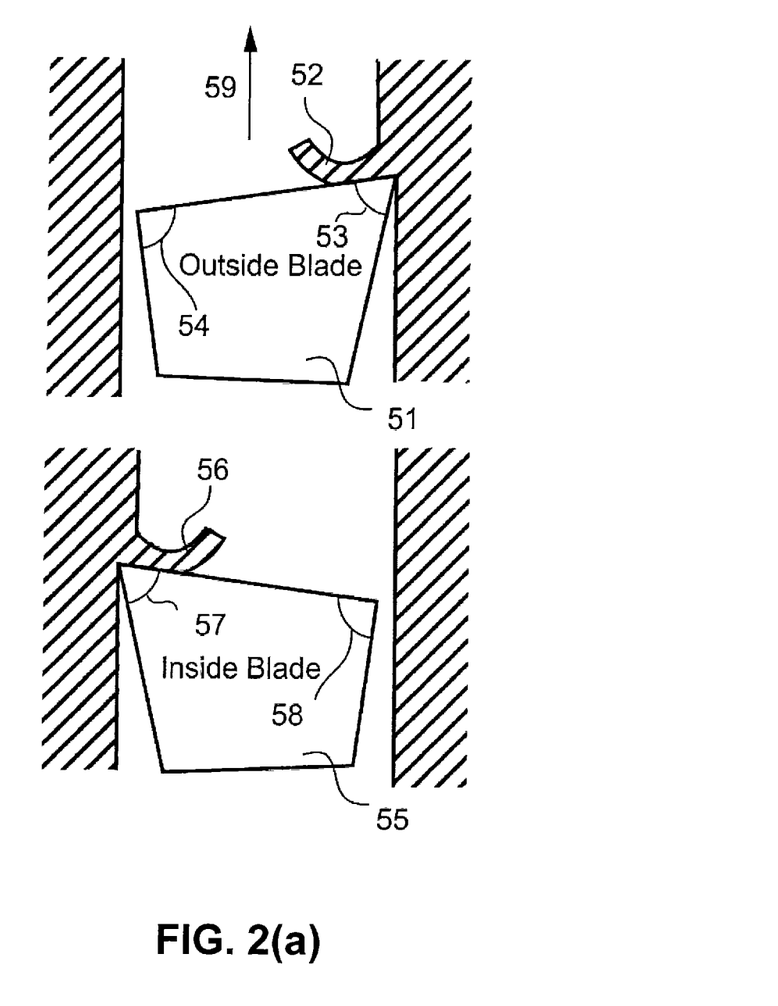

FIG. 2(a) shows the above chip removal arrangement with a vertical sequence of a cross-sectional view of an outside blade 51 and an inside blade 55. The relative cutting velocity direction 59 applies to both blades 51 and 55. Outside blade 51 has a sharp cutting edge 53 which cuts and forms chip 52 on the outside gear flank (concave flank). The clearance edge 54 of blade 51 has a dull shape and is not engaged in any cutting of the inside flank (convex flank). Inside blade 55 has a sharp cutting edge 57 which cuts and forms chip 56 on the inside gear flank (convex flank). The clearance edge 58 of blade 55 has a dull shape and is not engaged in any cutting of the outside flank (concave flank).

Another possibility which is known in the art is a cutter head with a single blade per blade group as shown in U.S. Pat. No. 7,775,749 for example. In such an arrangement, the single blade type (i.e. full profile blade) as shown in FIG. 3(a) will perform the roughing and finishing of the concave flanks, the concave root fillets, the root bottoms, the convex root fillets as well as the convex flanks of a bevel gear.

Figure 3A:
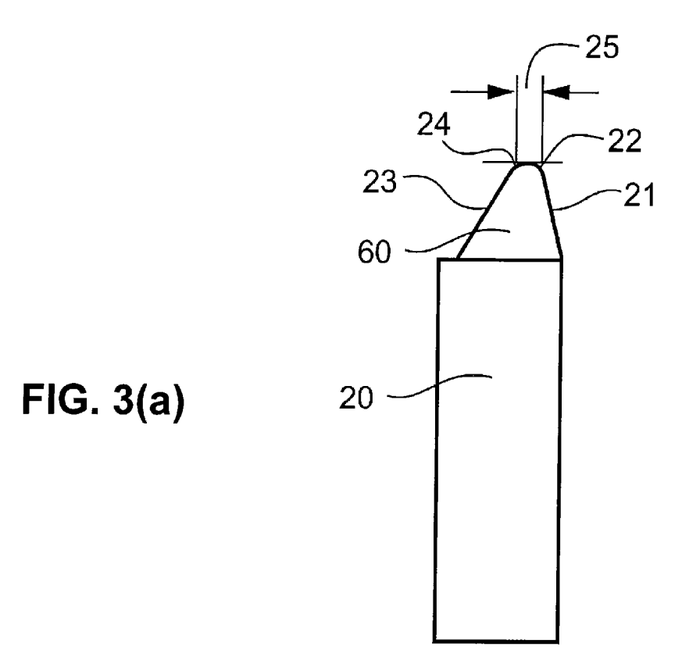

FIG. 3(a) shows the front view onto a full profile blade 20. The front face 60 has a neutral orientation which provides the same side rake angles to both cutting edges 21 and 23. Also shown are the tip edge radii 22 and 24. The blade top width 25 is equal to the root width of the gear to be cut which allows blade 20 to remove chips from both gear flanks (concave and convex) simultaneously. The full profile cutting blade 20 in FIG. 3(a) comprises of an outside cutting edge 21 with an edge radius 22, an inside cutting edge 23 with an inside edge radius 24 and a top width 25 which spaces the two cutting edges in order to cut the correct slot width.

Figure 2B:
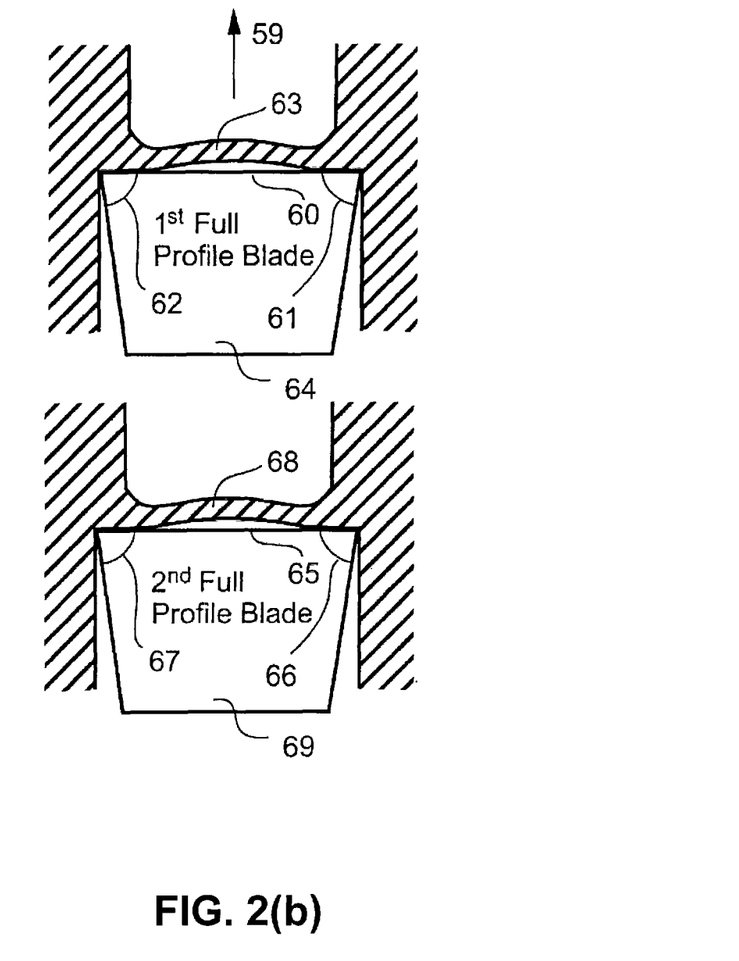

FIG. 2(b) shows a vertical sequence of a cross-sectional view of a full profile blade 64 and a second full profile blade 69. The relative cutting velocity direction 59 applies to both blades 64 and 69. Blade 64 has a front face 60 which is perpendicular to the relative cutting direction 59. The two cutting edges 61 and 62 of blade 64 cut off a connected chip 63 from the convex and the concave gear flank, as well as from the root area (not shown). The cutting edges 61 and 62 of blade 64 act neutral (not sharp) because the front face 60 is perpendicular to the cutting velocity direction.

The second blade 69 in FIG. 2(b) has a geometry identical to blade 64, with a front face 65 which forms cutting edges 66 and 67 which do not appear to be sharp, but neutral, with respect to the relative cutting velocity 59. In an ideal case, the chip 68 will be identical to chip 63. The radial adjustment of the full profile blades 64 and 69 in the cutter head such that cutting edge 61 has the same radial position in the cutter head than cutting edge 66 and cutting edge 62 has the same radial position in the cutter head than cutting edge 67 is practically impossible. It is not possible to realize different radial adjustments to the two cutting edges (e.g. 61 and 62) which are part of the same blade. Inaccuracies in the blade profile grinding as well as inaccuracies in the cutter head slots cannot be compensated by individual adjustments of the individual cutting edges.

The chips 63 and 68 are large and bulky and difficult to remove from the cutting zone. Due to the chip forming on two opposite cutting edges with a neutral angle of front faces 60 and 65, the chip forming of the two cutting edges 61 and 62 as well as 65 and 57 opposes each other and hinders an optimal chip shearing and forming. As a result, the cutting forces and the temperatures of chips and parts generated by a cutting process using the tool geometry shown in FIG. 2(b) are higher compared to the cutting forces and temperature of chips and parts generated by a cutting process using the tool geometry shown in FIG. 2(a).

The blades 64 and 69 belong to different blade groups. Cutter heads with blades according to FIG. 2b have one blade per blade group.

The single blade type cutter heads are only applied to face milled bevel gears which are cut in a completing process, because completing bevel gears show a parallel slot width along the root bottom between toe and heel. The single blade cutting process (schematically shown in FIG. 2(b)), which only uses one blade type 64 in order to manufacture both flanks of each gear slot including the slot bottoms, has a number of disadvantages. The blade front face 60 which connects the both cutting edges (and in general is a plane surface) can only provide side rake angles of about zero degree for both cutting edges 61 and 62. With a side rake angle of zero degree (front face 60 perpendicular to relative cutting velocity 59), the chip removal process has to conduct more plasticization work in order to remove chips (rather than shearing the chips off with a sharp cutting edge which requires a positive side rake angle).

Due to the cutting action around the entire blade profile (sections 23-24-25-22-21 in FIG. 3(a)) the chips from the two flanks are often a connected single chip like 63 and 68. Both zero side rake angle as well as connected chips lead to higher cutting forces and higher part temperature during cutting and subsequently cause lower part quality. Another disadvantage is that the connected outside-inside chips 63 and 68 require a large space and therefore are not flowing away from the cutting area easily. Large bulky chips are more likely to lead to chip packing between consecutive blades than smaller rolled chips 52 and 56 (FIG. 2(*a*)) produced with the outside-inside blade cutting system which has two blades 51 and 55 per blade group.

SUMMARY OF THE INVENTION

The present invention comprises a gear cutting tool wherein each cutting blade group includes two differently positioned but identical cutting blades (e.g. one outside blade and one inside blade). The inventive blade arrangement only requires a single type of blade in order to simultaneously cut the convex and the concave tooth flanks of a gear as well as the root fillet and root bottom portions of tooth slots. The inventive cutter system allows radial adjustment of the outside cutting blade and the inside cutting blade independently of one another. Additionally, inside and outside cutting blades may be exchanged with one another.

BRIEF DESCRIPTION OF THE DRAWINGS

FIG. 2(*a*) shows a vertical sequence of a cross-sectional view of an outside cutting blade and an inside cutting blade.

FIG. 2(*b*) shows a vertical sequence of a cross-sectional view of a first full profile cutting blade and a second full profile cutting blade.

FIG. 2(*c*) shows a vertical sequence of a cross-sectional view of the inventive mono-blade and a second mono-blade.

FIG. 3(*a*) shows the front view of a full profile cutting blade.

FIG. 3(*b*) shows the front view of a mono-blade according to the invention.

FIG. 3(*c*) shows the front view of two consecutive mono-blades.

DETAILED DESCRIPTION OF THE PREFERRED EMBODIMENT

The terms "invention," "the invention," and "the present invention" used in this specification are intended to refer broadly to all of the subject matter of this specification and any patent claims below. Statements containing these terms should not be understood to limit the subject matter described herein or to limit the meaning or scope of any patent claims below. Furthermore, this specification does not seek to describe or limit the subject matter covered by any claims in any particular part, paragraph, statement or drawing of the application. The subject matter should be understood by reference to the entire specification, all drawings and any claim below. The invention is capable of other constructions and of being practiced or being carried out in various ways. Also, it is understood that the phraseology and terminology used herein is for the purposes of description and should not be regarded as limiting.

The details of the invention will now be discussed with reference to the accompanying drawings which illustrate the invention by way of example only. In the drawings, similar features or components will be referred to by like reference numbers.

The use of "including", "having" and "comprising" and variations thereof herein is meant to encompass the items listed thereafter and equivalents thereof as well as additional items.

Although references may be made below to directions such as upper, lower, upward, downward, rearward, bottom, top, front, rear, etc., in describing the drawings, these references are made relative to the drawings (as normally viewed) for convenience. These directions are not intended to be taken literally or limit the present invention in any form. In addition, terms such as "first", "second", "third", etc., are used to herein for purposes of description and are not intended to indicate or imply importance or significance.

Figure 3B:
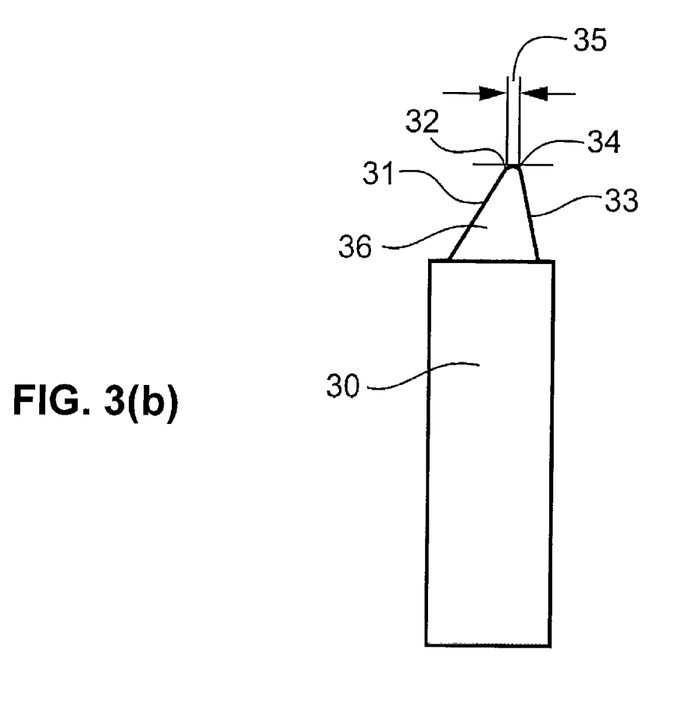
Figure 3C:
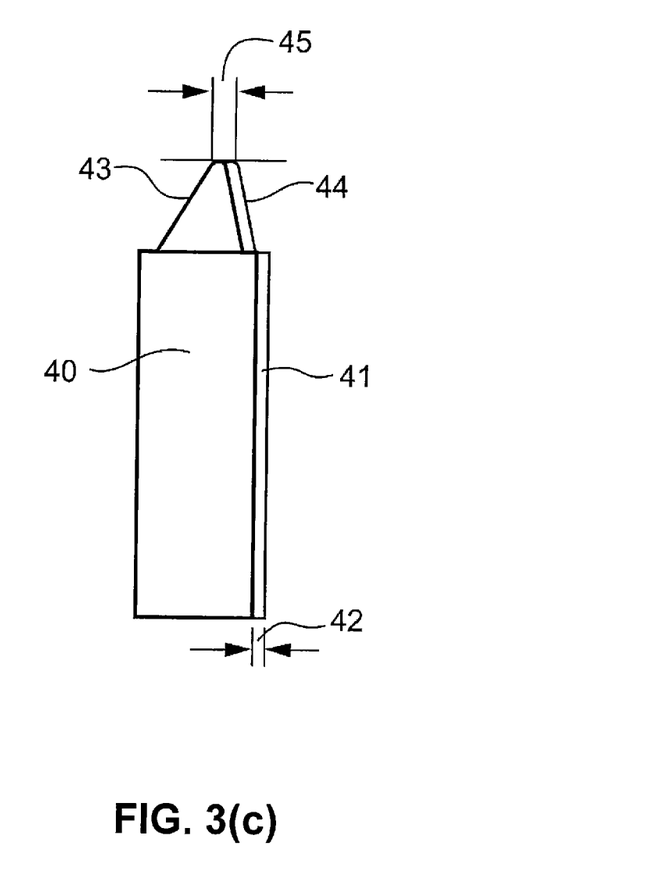

An inventive cutting blade 30 is shown in FIG. 3(*b*) and is provided with an inside cutting edge 31 which duplicates the pressure angle and shape of 23 and has a tip edge radius 32 which is identical to 24. The front face 36 of the cutting blade has a neutral orientation which provides the same rake angles to both cutting edges 31 and 33. The blade top width 35 is smaller than the top width 25 of the full profile blade 20 by an amount 42 (FIG. 3(*c*)). Tip edge radius 34 is preferably identical to 22 and the outside cutting edge 33 has the same pressure angle and shape as 21. Cutting edge 33 is closer to cutting edge 31 (by the amount 42) compared to cutting edge 21 which has a larger distance to 23.

Two cutting blades of the blade type 30 are positioned in a cutter head which has a small difference of the slot bottom radii. This is depicted in FIG. 3(*c*) with cutting blades 40 and 41 which are both identical to cutting blade 30. Blades 40 and 41 are positioned behind each other but shifted sideways with respect to one another by the amount 42. This arrangement places cutting edge 31 in position 43 and cutting edge 33 in position 44.

Figure 2C:
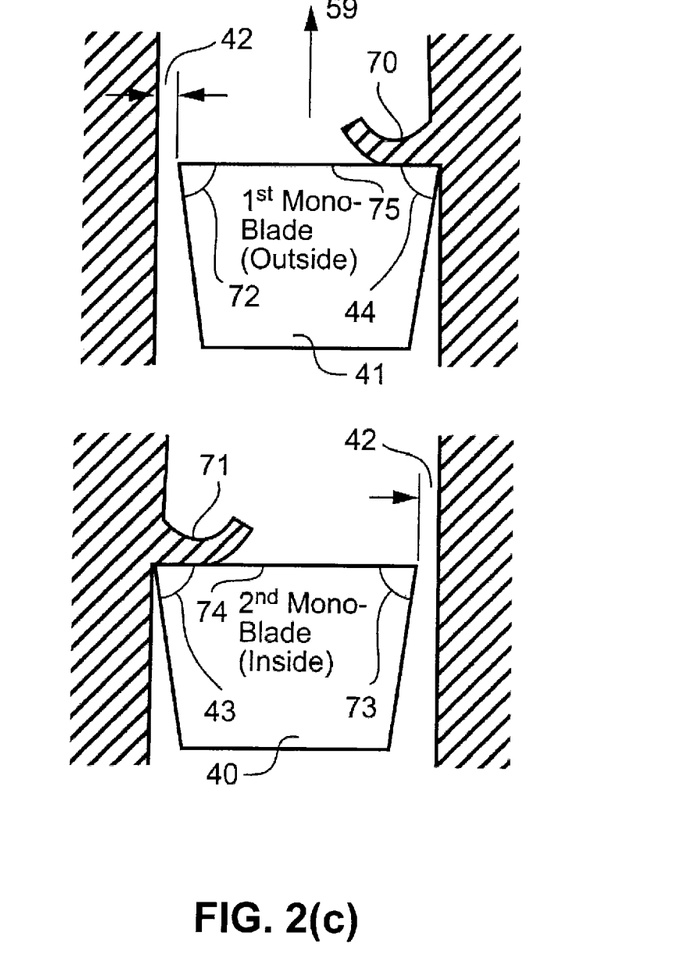

The arrangement of blades 40 and 41 provides an inside cutting edge 43 which is identical in its radial location, pressure angle and shape to cutting edge 23. The arrangement of blades 40 and 41, also provides a top width 45 over both blades which is equal to 25. Consequently, the cutting edge 44 has the same pressure angle, shape and radial location as cutting edge 21. The blade arrangement 40 and 41 consists of two differently positioned but identical blades (one outside blade and one inside blade). Hence, the inventive cutting blades may be referred to as mono-blades. The produced gear slot geometry is identical to the geometry produced by full profile blade 20. Like the full profile blade 20, the inventive blade arrangement only requires a single type of blade in order to simultaneously cut, in a completing cutter head, the convex and the concave flanks as well as the root fillets and root bottoms. FIG. 2(*c*) shows the first mono-blade 41 acts as an outside blade with cutting edge 44 removing a chip 70 as a single side chip. The clearance side 72 of blade 41 shows a clearance gap 42 with respect to the convex flank. The next mono-blade 40 acts as an inside blade with cutting edge 43 removing a chip 71 as a single side chip. The clearance side 73 of blade 40 shows a clearance gap 42 with respect to the concave flank.

Advantages of the inventive mono-blade system include:
- The separation of the inside and outside cutting to two different blades which have the identical specification, which reduces the variety of different blade geometries to be administrated, handled and refurbished.
- Chip formation is more optimal and the cutting process is smoother.
- The cutting forces of the inventive blade arrangement are lower than the cutting forces of the full profile blade 20 which also lowers the process temperature.
- The inventive mono-blade cutter system allows radial adjustment of the outside cutting blade and the inside cutting blade independently. Blade adjustment for full profile blades 20 is impossible because of the continuity between the two cutting edges on one blade. One cutting edge cannot be shifted relative to the other cutting edge. Both cutting edges move together.
- Part quality produced with inventive blade and cutter system is higher than part quality of full profile blade system (blade 20)
- After the end of the tool life, cutting edges 44 and 43 (including the tip edge radius at the respective side) are worn. It is possible to exchange blade 40 and 41 such that clearance edge 73 now becomes a cutting edge instead of 44 and clearance edge 72 becomes a cutting edge instead of 43. This provides a complete second tool life without and regrinding and recoating. The cost savings of a second tool life are significant.

Figure 4:
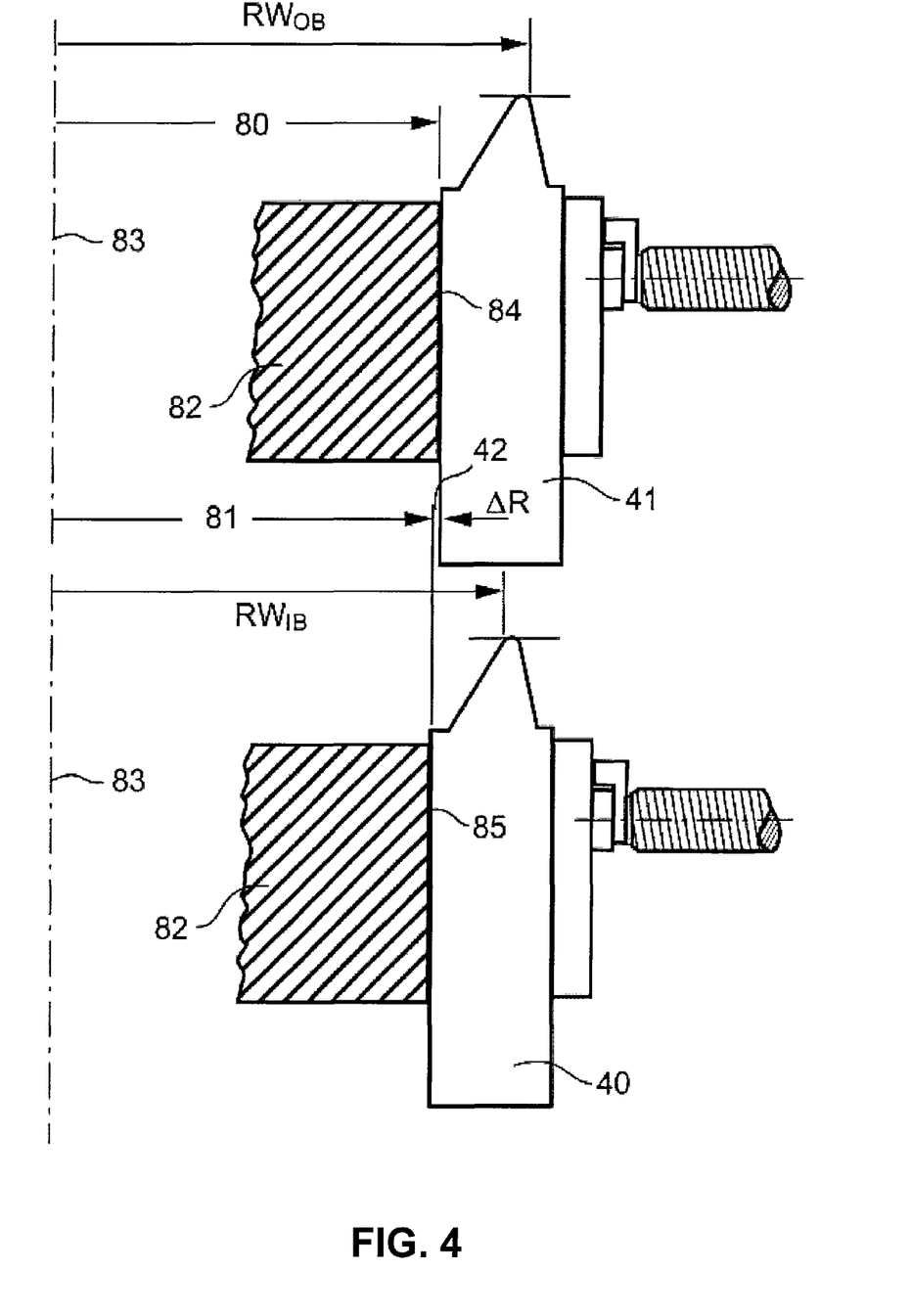
FIG. 4 shows a vertical sequence of cross-sectional views of a cutter head 82 with its center line 83 and an outside slot seating surface 84 with mono blade 41 and an inside slot seating surface 85 with mono blade 40.

FIG. 4 shows a vertically represented sequence of cross-sectional views of a cutter head 82 with its center line 83 (axis of rotation) and an outside slot seating surface 84 with mono-blade 41 and an inside slot seating surface 85 with mono-blade 40. The blade point radius of the outside blade, which cuts the concave gear flank $RW_{OB}$ is achieved by placing blade 41 on seating surface 84 with slot bottom radius 80. The blade point radius of the inside blade, which cuts the convex gear flank $RW_{IB}$, is achieved by placing blade 40 on a seating surface 85 with slot bottom radius 81. Radius 81 is reduced versus radius 80 by the amount 42. The cutter head design in FIG. 4 allows utilization of identical blades 40 and 41 with the result that blade 41 acts as outside blade while blade 40 acts as inside blade.

The different slot bottom radii in conventional cutter heads with inside and outside blades are commonly stepped. Stepping means that the inside blades have a smaller slot bottom radius than the outside blades. The difference amount between the slot bottom radii of outside and inside blades are 5 to 20 times larger than the amount 42 required for the inventive mono-blade positioning. The difference in slot bottom radii allows conventional cutter heads to cover a wide spectrum of different bevel gear designs and also allows cutting of gears having a range of modules.

Figure 5:
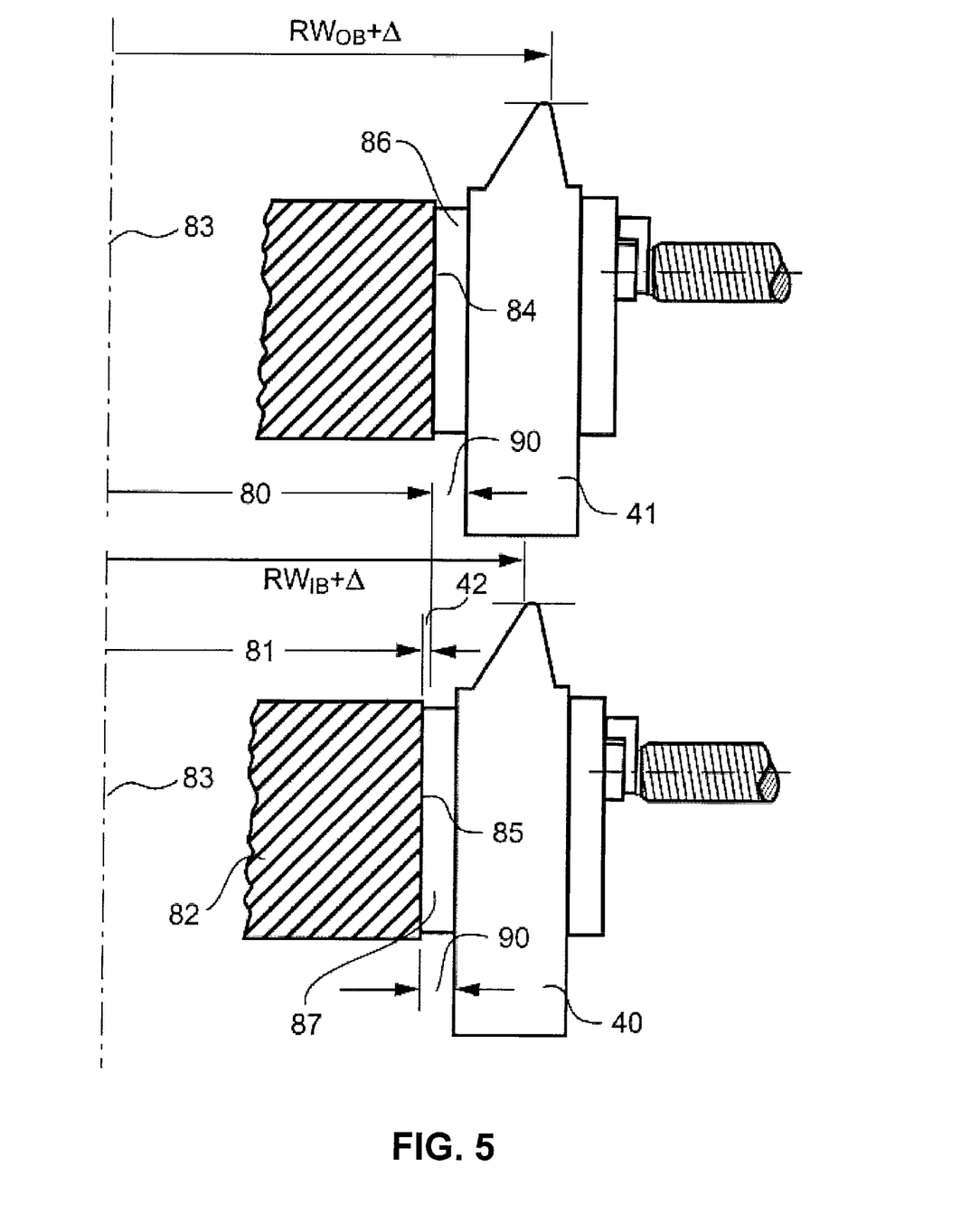
FIG. 5 shows the cutter head of FIG. 4 with the addition of spacer blocks 86 and 87.

FIG. 5 shows a vertical sequence of cross-sectional views of a cutter head 82 with its center line 83 (axis of rotation). In order to enable the inventive mono-blade cutter system to cover also a wide range of different bevel gear designs and modules, the blade seating surfaces 84 and 85 can be modified and plan-parallel spacer blocks 86 and 87 can be connected to them as shown in FIG. 5. Cutter head 82 can be utilized with or without the spacer blocks 86 and 87. Different sizes 90 of the spacer blocks can be prepared in order to achieve large radius span $RW_{OB}+\Delta$ and $RW_{IB}+\Delta$ by making a variety of spacer blocks 86 and 87 with different thicknesses available. In a preferred embodiment, the radius difference between outside blade 41 and inside blade 40 is realized in the seating surfaces 84 and 85 of the cutter head. The assortment of spacer blocks in the preferred embodiment uses blocks 86 and 87 of identical thickness 90 (for inside and outside blade slots).

It is also possible to use spacer blocks of different thickness for outside and inside blade slot. This is advantageous if a wide module range has to be covered. The different block thicknesses 86 and 87 also allow consolidation of a variety of different gear designs for the usage of the same blade geometry (in case of identical pressure angles but different gear slot widths).

Another variation of the inventive cutter system is to make the slot bottom radii 80 and 81 identical and work the radius difference required into the spacer blocks 86 and 87. Also a combination where a partial amount of 42 is applied to the cutter design and a second partial amount of 42 is designed in the spacer blocks is possible.

Figure 6:
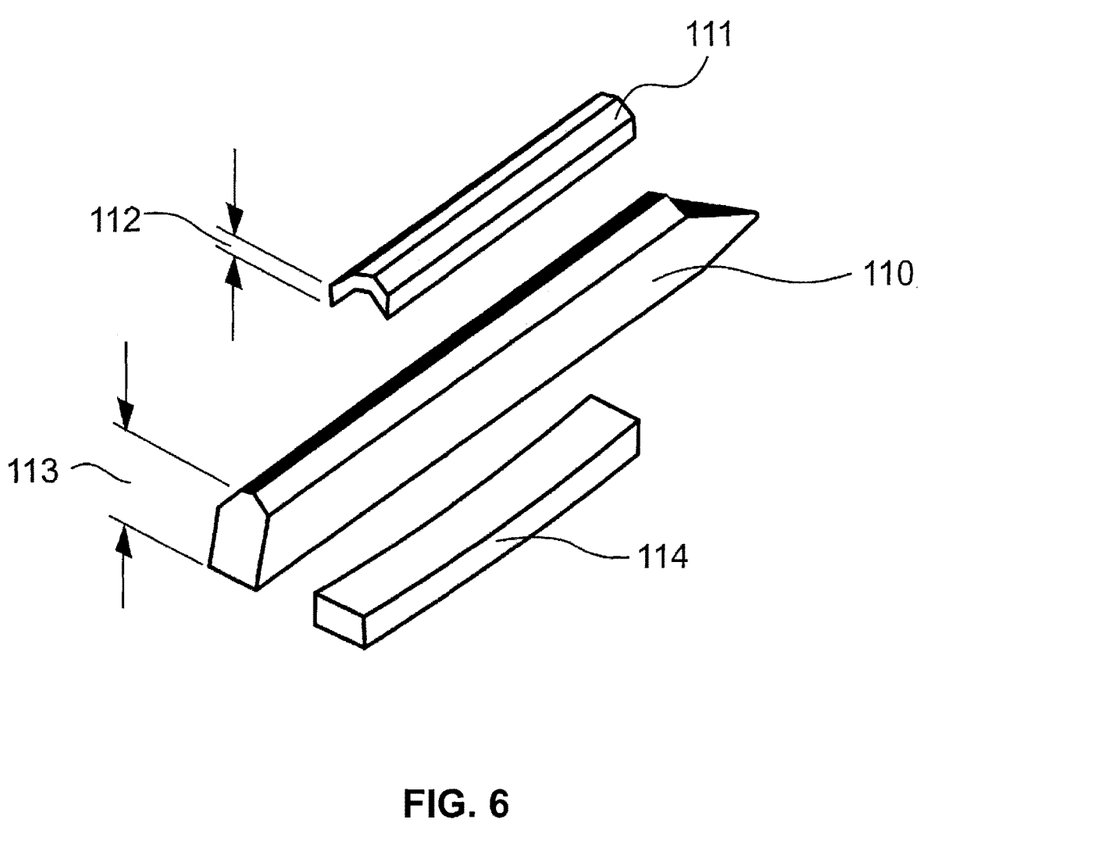
FIG. 6 shows a three-dimensional view of a cutting blade 110 with a pentagon shaped cross section having a clamp block 114 below the blade and a spacer prism 111 above the blade.

The inventive mono-blade cutter head system can be realized in cutter heads with rectangular slots 15 and 16 like cutter head 10 in FIG. 1 or in cutter heads with pentagon-shaped slot cross section (e.g. U.S. Pat. No. 6,120,217) and stick blades according to 110 as shown in FIG. 6. The spacer block 111 will in this case have the form of a prism. Clamp block 114 is located below the blade 110 and a spacer block 111 above blade 110. The spacer block 111 fulfills the analogue function for blades with a pentagon shaped cross section 110 as the spacer blocks 86 and 87 fulfill for rectangular blades 41 and 40. The spacer block 111 will shift the usable blade width 113 about a distance of 112 to a larger radius. The thickness 112 of the spacer block 111 can be manufactured in order to exactly duplicate the thickness 90 of the rectangular spacer blocks 86 and 87.

Figure 7:
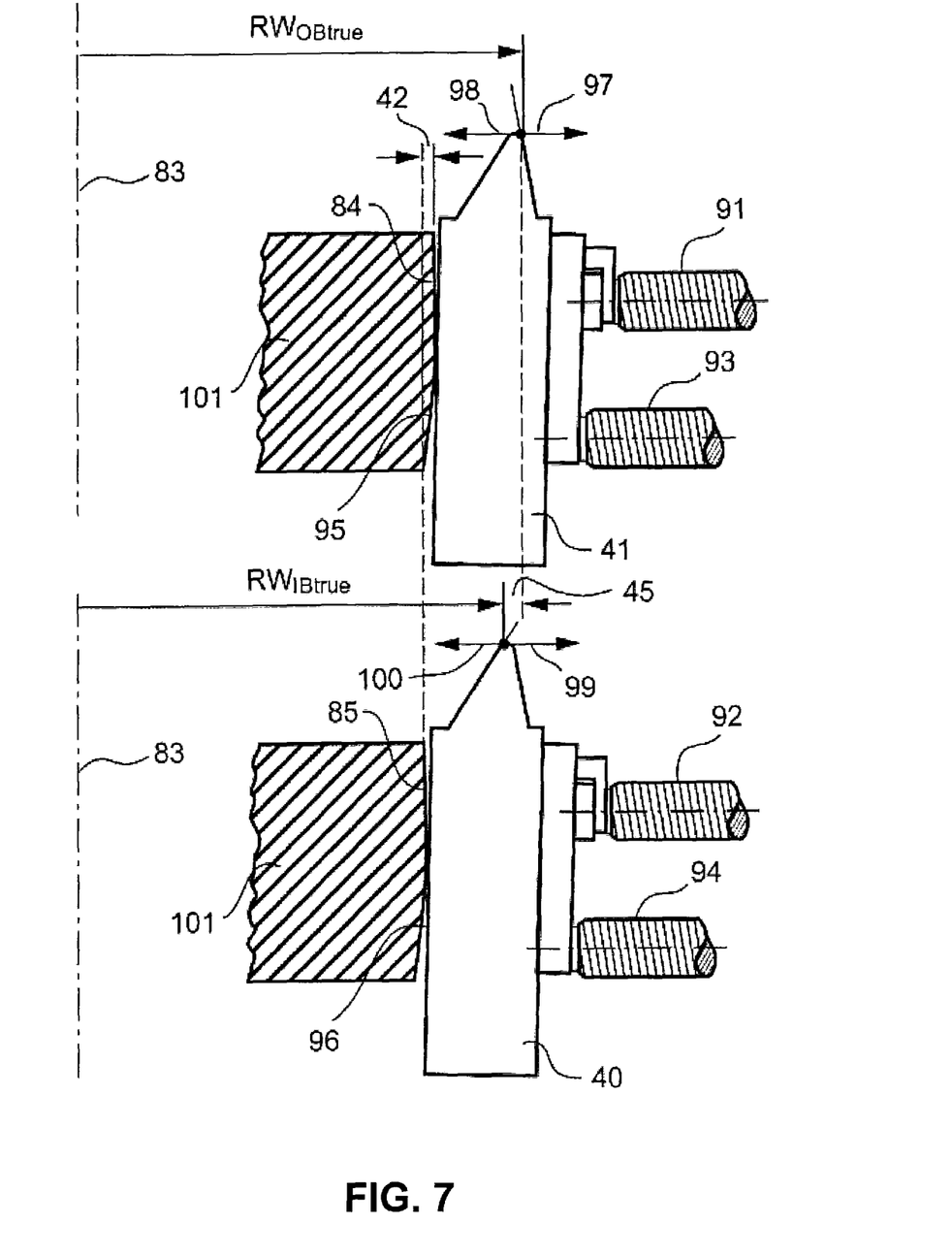
FIG. 7 shows a vertical sequence of cross-sectional views of a cutter head 101 with its center line 83 and an outside slot seating surface 84 with mono-blade 41 and an inside slot seating surface 85 with mono-blade 40.

The inventive cutter head system can also be realized with radially adjustable cutters (e.g. US 2015/0290725 or US 2015/0306688). FIG. 7 shows a vertical sequence of cross-sectional views of a cutter head 101 with its center line 83 (axis of rotation) and an outside slot seating surface 84 with mono blade 41 and an inside slot seating surface 85 with mono blade 40. FIG. 7 shows the seating surfaces 84 and 85 which are unmodified in the upper section and have a modification 95 and 96 in the lower section. In addition to the clamp screws 91 and 92, respective adjustment screws 93 and 94 are implemented. A clockwise rotation of the adjustment screw 93 will move the tip of blade 41 in direction 97 and increase the point radius $RW_{OBtrue}$. A counterclockwise rotation of adjustment screw 93 will move the blade tip in direction 98 and reduce the point radius $RW_{OBtrue}$. A clockwise rotation of the adjustment screw 94 will move the tip of blade 40 in direction 99 and increase the point radius $RW_{IBtrue}$. A counterclockwise rotation of adjustment screw 94 will move the blade tip in direction 100 and reduce the point radius $RW_{IBtrue}$. This makes it possible to adjust blade 41 and blade 40 independently from each other to a precise radial location for an optimal cutting process and also assure the precise overall blade top width 45. Also in cutter head 101 two identical mono-blades 41 and 40 are preferably utilized. The seating surfaces 84 and 85 have a radius difference of 42, which makes mono blade 41 an outside blade and mono blade 40 an inside blade.

Instead of modifying the cutter head seating surfaces 84 and 85, it is also possible to use unmodified seating surfaces and machine the modifications 95 and 96 on the spacer blocks 86 and 87 (FIG. 5). Also, a combination of cutter head seating surface modifications and spacer block modifications is practically possible and useful in particular cases.

Another embodiment of the inventive tool arrangement is to use a cutter head 101 with outside blade slots 84 which have a slot bottom radius 80 equal to the radius 81 of the inside blade slots 85. In this case the difference amount 42 is equal to zero. In order to utilize mono-blades and still have the advantage of pure outside cutting of slots 84 and pure inside cutting of slots 85, the outside blades 41 can be adjusted with larger base amounts in direction 97 and the inside blades 40 can be adjusted with small base amounts in direction 99 (FIG. 7). For example, the mono-blades can be ground to a blade top width 35, which is 0.050 mm less than the top width 25, required to cut the correct gear slot width and built in a cutter head 101 in the initial positions for inside and outside blades as shown in FIG. 7. Then the outside blades 41 can be adjusted 0.025 mm (plus or minus small truing amounts) in direction 97 and the inside blades 40 can be adjusted 0.025 mm (plus or minus small truing amounts) in direction 100. This arrangement will also provide mono-blades 41 which only cut on the outside cutting edges and inside mono-blades 40 which only cut on the inside cutting edges.

The mono-blade and cutter system, as it was described above for the single indexing face milling process, can also be utilized in the continuous indexing face hobbing process. In order to achieve identical inside and outside blades, the blade timing cannot be controlled with individual front face distances between outside and inside blades. The blade timing, which is the angular distance between the reference point of the inside blade cutting edge and the reference point of the outside blade cutting edge influences the slot with and therewith the tooth thickness. If the front face distance and all other parameter of the blade which is placed in an outside slot are equal to the parameters of the inside blade, then the correct tooth thickness in a completing cut can only be established with a change of the radial location of the cutting edges. In order to keep both blades identical, a slot width discrepancy of for example +Δs can be corrected by increasing the radius of the inside cutting edge by Δs/2 and reduction of the outside cutting edge radius by Δs/2. In this case, the correct tooth slot width (and tooth thickness) will be achieved by using identical blades in the cutter head slots for the outside cutting as well as in the cutter head slots for the inside cutting.

The slot radii of outside and inside cutting slots have to be located in order to achieve for an average gear cutting the same radius of the reference point on both the outside and the inside cutting edge. In order to cover a wider range of gear designs, spacer blocks 86 and 87 can be also utilized in face hobbing.

While the invention has been described with reference to preferred embodiments it is to be understood that the invention is not limited to the particulars thereof. The present invention is intended to include modifications which would be apparent to those skilled in the art to which the subject matter pertains.

What is claimed is:

1. A single indexing method of cutting bevel and hypoid gears comprising:
providing a cutting tool comprising a cutter head rotatable about a cutter axis and including a plurality of blade slot groups with each of said groups having at least two blade positioning slots, at least one of said blade slot groups including a first cutting blade positioned in one of the blade positioning slots and a second cutting blade positioned in the other of the blade positioning slots, said first and second cutting blades each having a cutting end comprising a first cutting edge and a second cutting edge with the cutting ends of the first and second cutting blades being the same,
rotating said cutting tool and bringing the rotating cutting tool and a gear workpiece into engagement with one another, said first and second cutting blades being operated to cut a plurality of tooth slots in the gear workpiece, the tooth slots each defining a space between a convex tooth surface of one gear tooth and an opposite concave tooth surface of an immediately adjacent gear tooth on said gear workpiece, wherein said first and second cutting blades are positioned with respect to one another in said blade slot group in a first orientation with one of said first and second cutting blades being operated to cut one of said convex tooth surface or said concave tooth surface of each of said tooth slots with one of said first cutting edge or said second cutting edge, and the other of said first and second cutting blades being operated to cut the other of said convex tooth surface or said concave tooth surface of each of said tooth slots with the other of said first cutting edge or said second cutting edge,
said method further comprising,
exchanging the position of said one of said first and second cutting blades in said cutter head and the position of said the other of said first and second cutting blades in said cutter head with one another in said cutter head whereby said first and second cutting blades are positioned with respect to one another in said cutter head in a second orientation being opposite to said first orientation,
rotating said cutting tool and bringing the rotating cutting tool and another gear workpiece into engagement with one another, wherein in said second orientation, said one of said first and second cutting blades is operated to cut the opposite tooth surface of said first orientation with the opposite cutting edge of said first orientation, and wherein said other of said first and second cutting blades is operated to cut the opposite tooth surface of said first orientation with the opposite cutting edge of said first orientation,
wherein a tooth slot of said another gear workpiece cut by said second orientation is the same as the tooth slot of said gear workpiece cut by said first orientation.

* * * * *